US008516398B2

(12) United States Patent
Nordenhake

(10) Patent No.: US 8,516,398 B2
(45) Date of Patent: Aug. 20, 2013

(54) METHOD AND SYSTEM FOR GRAPHICALLY DELIMITING TEXT MESSAGE CONTENT FOR A MOBILE RADIO TERMINAL

(75) Inventor: Magnus Nordenhake, Malmö (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1826 days.

(21) Appl. No.: 11/428,590

(22) Filed: Jul. 5, 2006

(65) Prior Publication Data

US 2007/0260975 A1 Nov. 8, 2007

Related U.S. Application Data

(60) Provisional application No. 60/746,724, filed on May 8, 2006.

(51) Int. Cl.
*G06F 3/14* (2006.01)
(52) U.S. Cl.
USPC ............................................. 715/864
(58) Field of Classification Search
USPC ................... 715/246–247, 864, 758
See application file for complete search history.

(56) References Cited

U.S. PATENT DOCUMENTS

| 4,709,348 | A | * | 11/1987 | Horn et al. .................... 715/205 |
| 4,984,162 | A | * | 1/1991 | Torii et al. ..................... 715/209 |
| 5,396,589 | A | * | 3/1995 | Ohnishi ........................ 715/210 |
| 6,816,615 | B2 | * | 11/2004 | Lui et al. ....................... 382/187 |
| 7,218,943 | B2 | * | 5/2007 | Klassen et al. ............... 455/466 |
| 2004/0015786 | A1 | * | 1/2004 | Pugliese ...................... 715/530 |
| 2006/0031764 | A1 | * | 2/2006 | Keyser et al. ................ 715/525 |

FOREIGN PATENT DOCUMENTS

| EP | 0 923 218 A2 | 6/1999 |
| EP | 0923218 | * 6/1999 |
| EP | 1 458 199 A1 | 9/2004 |

OTHER PUBLICATIONS

Microsoft Word 2003, Figures 1-3.*
International Search Report/Written Opinion (ISR/WO) for corresponding International Application No. PCT/IS2006/003144, mailed Mar. 6, 2007.

* cited by examiner

*Primary Examiner* — T. Vu
(74) *Attorney, Agent, or Firm* — Renner, Otto, Boisselle & Sklar, LLP

(57) ABSTRACT

A method for displaying written text during the preparation of a text message to be transmitted by a mobile radio terminal. Written text entered by a user is displayed. A graphical text message break is displayed between characters of the written text associated with a first text message payload and characters of the written text associated with a second text message payload, the first and second text messages used to transmit the written text as a multipart text message.

10 Claims, 3 Drawing Sheets

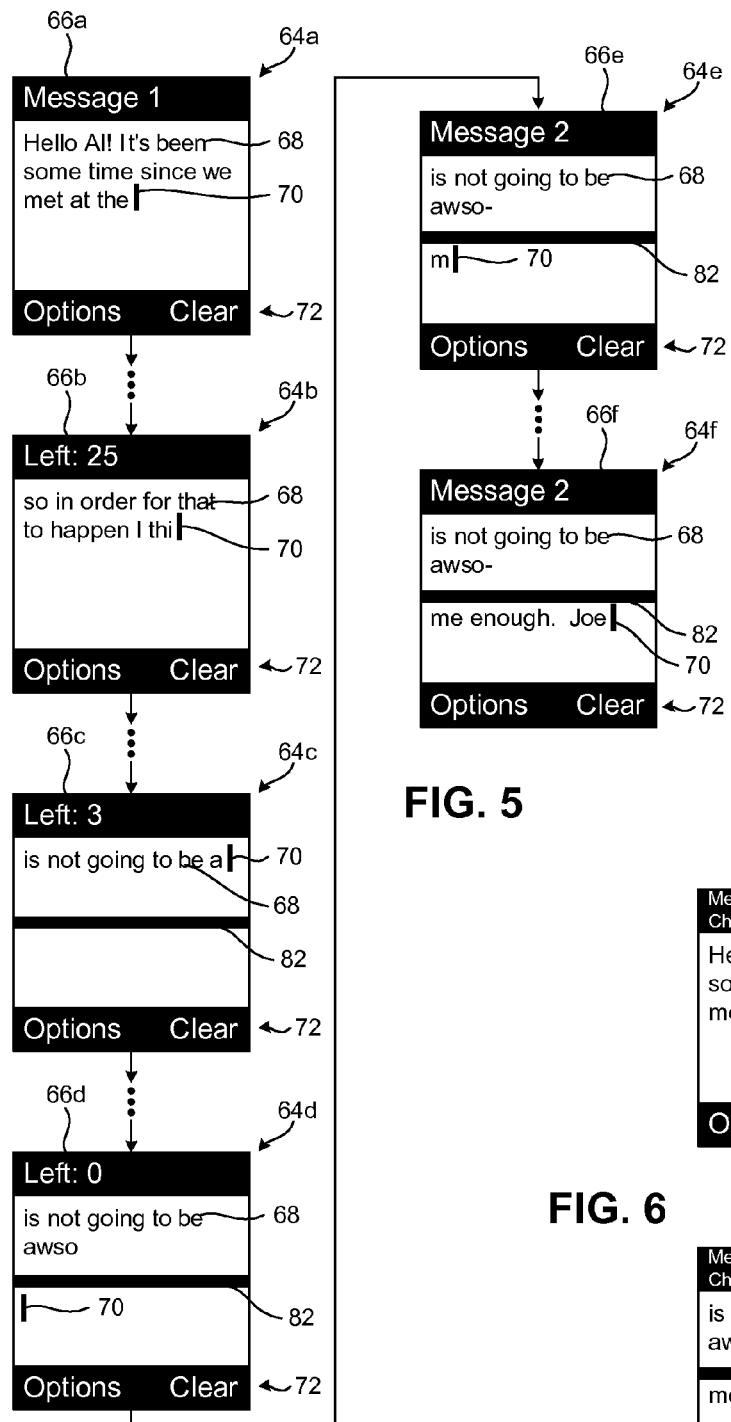
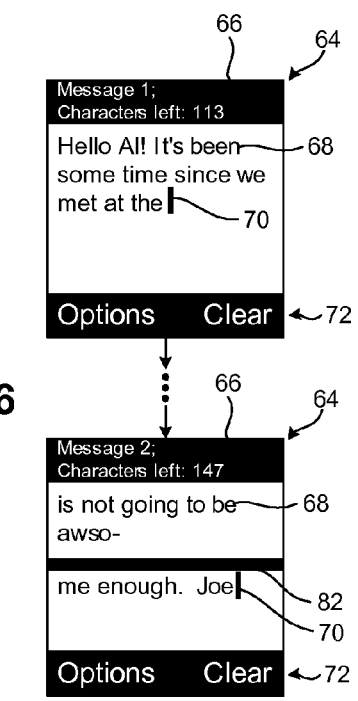
FIG. 5
FIG. 6

METHOD AND SYSTEM FOR GRAPHICALLY DELIMITING TEXT MESSAGE CONTENT FOR A MOBILE RADIO TERMINAL

RELATED APPLICATION DATA

This application claims the benefit of U.S. Provisional Patent Application Ser. No. 60/746,724, filed May 8, 2006, the disclosure of which is incorporated herein by reference in its entirety.

TECHNICAL FIELD OF THE INVENTION

The present invention relates generally to electronic equipment, such as electronic equipment for engaging in voice communications and/or for sending a text message. More particularly, the invention relates to a method and system for graphically delimiting text message content as the content is generated by the user.

DESCRIPTION OF THE RELATED ART

Mobile and/or wireless electronic devices are becoming increasingly popular. For example, mobile telephones and portable media players are now in wide-spread use. In addition, the features associated with certain types of electronic devices have become increasingly diverse. To name a few examples, many electronic devices have cameras, text messaging capability, Internet browsing functionality, electronic mail capability, video playback capability, audio playback capability, image display capability and hands-free headset interfaces.

Sending a text message, such as short message service (SMS) formatted message, is a convenient way to send a short text-based message from a mobile telephone to another device, such as another mobile telephone, a server and so forth. Text messages have a maximum payload, which is typically about 160 characters or about 170 characters. If a user writes text for a text message that exceeds the payload capacity, the written text may be broken into two or more text messages for transmission. Most communications service providers charge for each text message sent. In other service plans, the user may send a predetermined number of text messages within a fee structure for the service plan, but sending additional text messages may incur a fee.

Therefore, the user may be interested in knowing how many text messages will be sent for written text. Until now, there has not been a convenient way for the user to track the number of text messages that will be needed to send a portion of written text.

SUMMARY

According to one aspect of the invention, a method of displaying written text during the preparation of a text message to be transmitted by a mobile radio terminal includes displaying written text entered by a user; and displaying a graphical text message break between characters of the written text associated with a first text message payload and characters of the written text associated with a second text message payload, the first and second text messages used to transmit the written text as a multipart text message.

According to another aspect, the graphical text message break is a borderline extending across a display of the mobile radio terminal.

According to another aspect, the method further includes scrolling the graphical text message break relative to the written text as an end of the first text message approaches.

According to another aspect, the method further includes controlling a space between the graphical text message break and characters associated with the payload of the first text message such that there is a proportional correspondence between a number of characters remaining in the payload of the first text message and an end of the first text message as represented by the graphical text message break.

According to another aspect, characters displayed after the graphical text message break are shown in relative proportion to the graphical text message break to provide a visual indication as to how much text is present in the second text message.

According to another aspect, the method further includes displaying a text message count, the text message count indicating the number of text messages that will be used by the mobile radio terminal to transmit the written text in text message format.

According to another aspect, the method further includes displaying a number of available characters before a capacity of a last one of the text messages is reached.

According to another aspect of the invention, a mobile radio terminal includes a display a radio circuit for communicating with a communications network; and a controller that executes logic to display written text during the preparation of a text message to be transmitted by a mobile radio terminal. The logic includes logic to display written text entered by a user on the display; and display a graphical text message break between characters of the written text associated with a first text message payload and characters of the written text associated with a second text message payload, the first and second text messages used to transmit the written text as a multipart text message.

According to another aspect, the graphical text message break is a borderline extending across a display of the mobile radio terminal.

According to another aspect, the logic scrolls the graphical text message break relative to the written text as an end of the first text message approaches.

According to another aspect, the logic controls a space between the graphical text message break and characters associated with the payload of the first text message such that there is a proportional correspondence between a number of characters remaining in the payload of the first text message and an end of the first text message as represented by the graphical text message break.

According to another aspect, characters displayed after the graphical text message break are shown in relative proportion to the graphical text message break to provide a visual indication as to how much text is present in the second text message.

According to another aspect, the logic includes logic to display a text message count, the text message count indicating the number of text messages that will be used by the mobile radio terminal to transmit the written text in text message format.

According to another aspect, the logic includes logic to display a number of available characters before a capacity of a last one of the text messages is reached.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

FIG. 5 is an exemplary graphical representation of the operation of the text messaging function; and FIG. 6 is another exemplary graphical representation of the operation of the text messaging function.

DETAILED DESCRIPTION OF EMBODIMENTS

Figure 1:
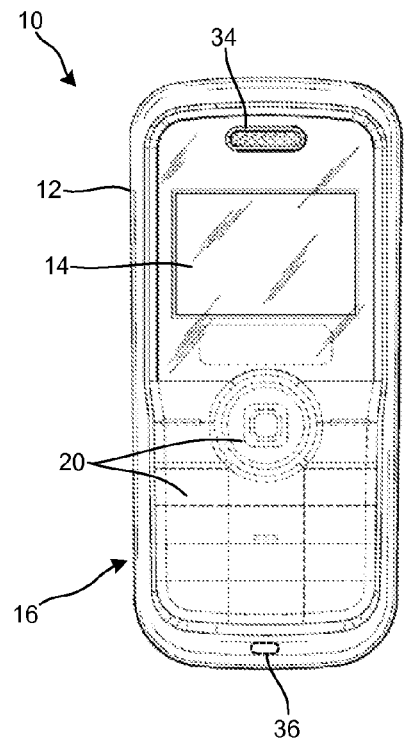
FIG. 1 is a schematic view of a mobile telephone as an exemplary electronic equipment in accordance with an embodiment of the present invention.

The present invention will now be described with reference to the drawings, wherein like reference numerals are used to refer to like elements throughout. It will be understood that the figures are not necessarily to scale.

The term "electronic equipment" includes portable radio communication equipment. The term "portable radio communication equipment," which herein after is referred to as a "mobile radio terminal," includes all equipment such as mobile telephones, pagers, communicators, electronic organizers, personal digital assistants (PDAs), smartphones, portable communication apparatus or the like.

In the present application, the invention is described primarily in the context of a mobile telephone. However, it will be appreciated that the invention is not intended to be limited to a mobile telephone and can be any type of appropriate electronic equipment. Also, embodiments of the invention are described primarily in the context of preparing a text message (e.g., a short message service (SMS) formatted message) for transmission. However, it will be appreciated that the invention is not intended to be limited to the preparation of a text message. For instance, the invention may have application to the preparation of a multimedia message, such as a multimedia messaging service (MMS) formatted message.

Referring initially to FIG. 1, an electronic equipment 10 is shown in accordance with the present invention. The electronic equipment includes a text message function that is configured to provide a user with a graphical representation of the number of text messages that may be used to transmit written text and show a demarcation between the written text for each text message. It will be appreciated that the text messaging function may be embodied as executable code that may be resident in and executed by the electronic equipment 10.

Figure 2:
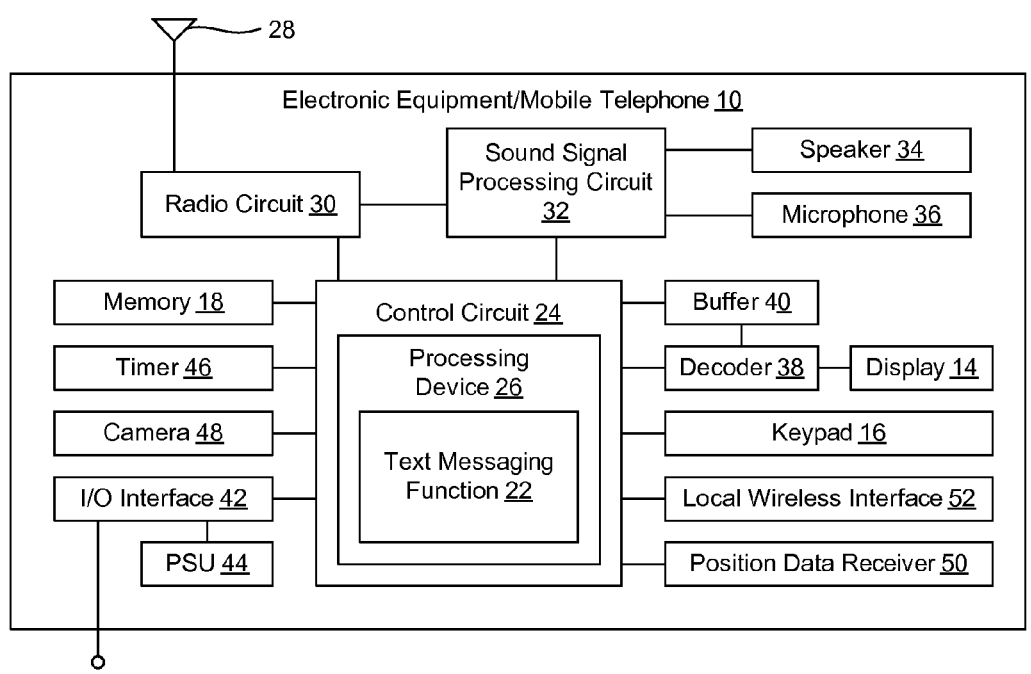
FIG. 2 is a schematic block diagram of the relevant portions of the mobile telephone of FIG. 1 in accordance with an embodiment of the present invention.
Figure 3:
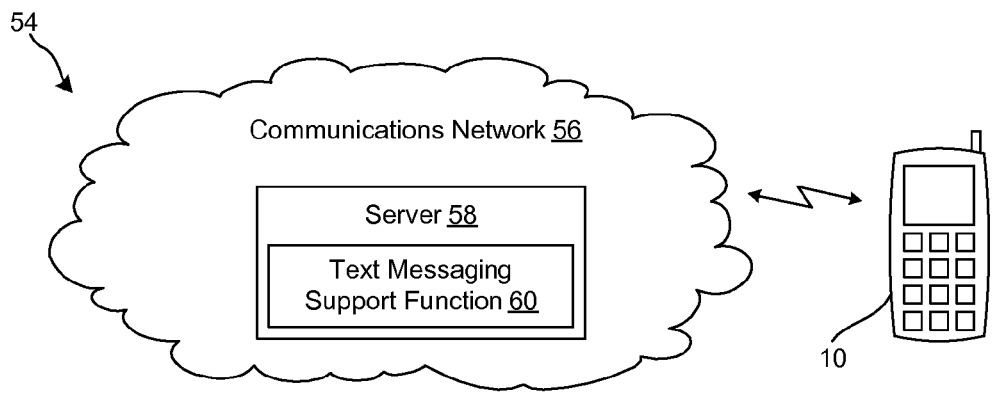
FIG. 3 is a schematic diagram of a communications system in which the mobile telephone of FIG. 1 may operate.

The electronic equipment in the exemplary embodiment of FIGS. 1-3 is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized.

The mobile telephone 10 includes a display 14 and keypad 16. As is conventional, the display 14 displays information to a user such as operating state, time, telephone numbers, contact information, various navigational menus, etc., which enable the user to utilize the various feature of the mobile telephone 10. The display 14 may also be used to visually display content received by the mobile telephone 10 and/or retrieved from a memory 18 (FIG. 2) of the mobile telephone 10. In addition, during the preparation of a text message, text that the user has written may be displayed on the display 14. The written text may be displayed as part of a graphical user interface (GUI), which may be generated by the text messaging function.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14. The keys 20 may be used to interact with the text messaging function, including entering written text (e.g., a string of alphanumeric characters) and operating GUI menus.

The mobile telephone 10 includes conventional call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. The call circuitry also may be responsible for transmitting text messages that are prepared by the user.

FIG. 2 represents a functional block diagram of the mobile telephone 10. For the sake of brevity, generally conventional features of the mobile telephone 10 will not be described in great detail herein. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform a text messaging function 22.

It will be apparent to a person having ordinary skill in the art of computer programming, and Specifically in applications programming for mobile telephones or other electronic devices, how to program a mobile telephone 10 to operate and carry out the functions described herein. Accordingly, details as to the specific programming code have been left out for the sake of brevity. Also, while the text messaging function 22 is executed by the processing device 26 in accordance with the preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive data and/or audiovisual content. For example, the receiver may be an IP datacast compatible receiver compatible with a hybrid network structure providing mobile communications and digital broadcast services, such as DVB-H mobile television and/or mobile radio. Other receivers for interaction with a mobile radio network or broadcasting network are possible and include, for example, GSM, CDMA, WCDMA, MBMS, WiFi, WiMax, DVB-H, ISDB-T, etc.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation. Audio data may be passed from the control circuit 24 to the sound signal processing circuit 32 for playback to the user. The audio data may include, for example, audio data from an audio file stored by the memory 18 and retrieved by the control circuit 24. The sound processing circuit 32 may include any appropriate buffers, decoders, amplifiers and so forth.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18, derived from an incoming video data stream received by the radio circuit 30 or obtained by any other suitable method. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown), such as a headset (sometimes referred to as an earset) to audibly output sound signals output by the sound processing circuit 32 to the user. Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, a hands-free adaptor (e.g., a headset that may audibly output sounds corresponding to audio data transferred from the mobile telephone 10 to the adapter), another mobile radio terminal, a computer or another device.

The mobile telephone 10 may be configured to transmit, receive and process data, such as text messages (e.g., colloquially referred to by some as "an SMS"), electronic mail messages, multimedia messages (e.g., colloquially referred to by some as "an MMS"), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth.

With additional reference to FIG. 3, the mobile telephone 10 may be configured to operate as part of a communications system 54. The system 54 may include a communications network 52 having a server 58 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 56 may support the communications activity of multiple mobile telephones 10, although only one mobile telephone 10 is shown in the illustration of FIG. 3.

In one embodiment, the server 58 may operate in stand alone configuration relative to other servers of the network 52 or may be configured to carry out multiple communications network 58 functions. As will be appreciated, the server 58 may be configured as a typical computer system used to carry out server functions and may include a processor configured to execute software containing logical instructions that embody the functions of the server 58. Those functions may include a text messaging support function 60. The text messaging support function 60 may receive and process text messages sent by the mobile telephone 10 for delivery to a specified destination and deliver text messages addressed to the mobile telephone 10 to the mobile telephone 10. Accordingly, the server 56 may be considered a messaging center.

Figure 4:
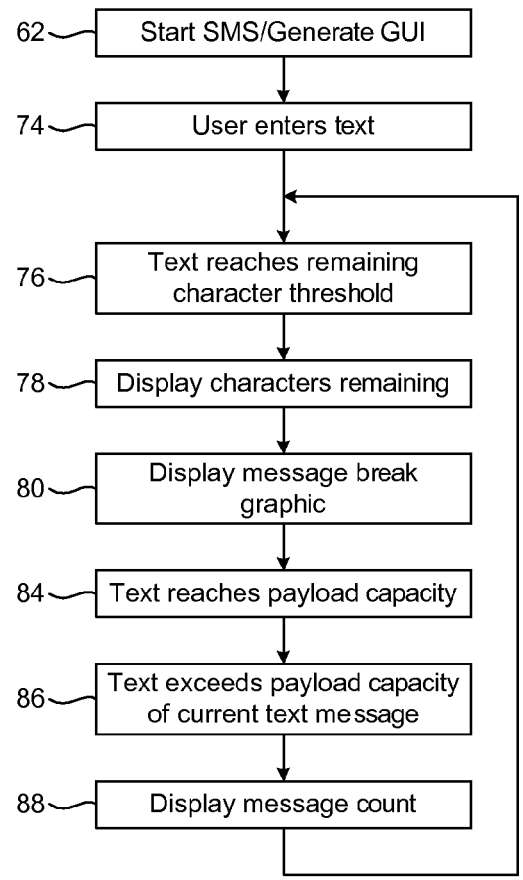
FIG. 4 is a flow chart of an exemplary text messaging function in accordance with the present invention.

With additional reference to FIG. 4, illustrated is a flow chart of logical blocks that make up the text messaging function 22. The flow chart may be thought of as depicting steps of a method. Although FIG. 4 shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

It will be understood that the illustrated method may end at any point in the method by user action, such as terminating the composition of a text message or taking action to send written text as a completed text message (or messages).

The method may begin in block 62 by launching the text messaging function 22 to start composition of a written text for transmission as one or more text messages. Launching of the text messaging function 22 may result in the display of a text message preparation GUI on the display 14 (FIGS. 1 and 2).

With additional reference to FIG. 5, an exemplary text message preparation GUI 64 is shown in various stages of text message preparation (e.g., depicted as 64a to 64f). The GUI 64 may include a header 66 that, at some points in the text message preparation, displays a message count and, at other times in the text message preparation, displays a characters remaining count until an additional text message to transmit the entire written text will be needed. The number of characters that any one text message may contain is dictated by the payload capacity of the text message, which is typically about 160 to about 170 alphanumeric characters.

The GUI 64 may show written text 68 that the user has keyed in, along with a cursor 70. Menu options 72 that, for example, correspond to function keys of the key pad 16 or provide touch screen functionality also may be displayed as part of the GUI 64.

Proceeding to block 74, the user may start to enter text as part of the composition of a first text message. At this point, while the user is composing the text, it is not known whether the written text (when completed) may be transmitted in one text message or will exceed the payload of one text message. If the written text exceeds the payload of one text message, a second text message will be started. Other than the graphical delimiters added to the GUI 64 by the text messaging function 22 and described in greater detail below, the two text messages will appear as one body of written text to the user. Additional written text may result in the generation of a third text message and so on. As will be appreciated, for transmission of written text that is too long to be sent in one text message, the written text is broken up and placed in respective text messages for transmission individually. The transmission of multiple text messages for a single composition of written text may be referred to as a multi-part text message for the purposes of the description herein. When each separate text message transmission is delivered to the destination, the destination device may reassemble the written text from the plural text messages.

As shown in FIG. 5, when the user starts to compose written text, the GUI 64 may display a header 66 that shows the message count (see header 66a of GUI 64a). The message count is the number of individual text messages that the mobile telephone 10 may need to transmit all of the written text composed thus far.

Proceeding to block 76, the text message function 22 monitors for a condition where the written text reaches a characters remaining count threshold. The characters remaining count threshold may be a predetermined number of characters that will fill the payload of the current text message. In the illustrated embodiment, the characters remaining count threshold is twenty-five characters, but this value may be changed as a default or user setting for the text message function 22.

Proceeding to block 78, if the characters remaining count threshold is reached, the message count displayed in the header 66 (see 66a) of the GUI 64 will be replaced by the number of characters remaining in the current text message (see header 66b of GUI 64b). If the user has composed less than one text message worth of text, but entered a number of characters so that the number of characters remaining to fill one text message is less than the characters remaining count threshold, the displayed number of characters refers to the number of characters available before the user would fill the payload of a single text message. Similarly, if the user has composed more than one text message worth of text, but less than two text messages worth of text and entered a number of characters so that the number of characters remaining to fill the second text message is less than the characters remaining count threshold, the displayed number of characters refers to the number of characters available before the user would fill the payload of the second text message component of a corresponding multi-part text message.

Proceeding to block 80, as the user continues to compose the message and nears the capacity of a single text message, the GUI 64 may include a graphical text message break 82. The break graphic 82 (see GUI 64c) in the illustrated example is a bar or "borderline" drawn across the display 14 to separate text associated with a first text message for transmission (such text shown above the bar) and text associated with a second text message for transmission (such text shown below the bar). Also, the character remaining count as displayed in the header 66 (see header 66c of GUI 64c) is decremented as characters are entered. The break graphic 82 may be displayed on reaching the characters remaining count threshold or when a different number of characters in the current text message remain. In another embodiment, the break graphic 82 may be displayed from the beginning of text entry (e.g., when the GUI 64 is displayed, but no text has been written by the user).

The break graphic 82 visually portrays to the user the location of the end of the current text message and how quickly the end of the message is approaching. In one embodiment, the break graphic 82 can be shown as scrolling upward from a bottom portion of the GUI 64. The space between the break graphic 82 and the displayed text 68 (and/or cursor 70) can be controlled so that there is a proportional correspondence between the number of characters remaining in the current text message and the end of the current text message as indicated by the break graphic 82. Furthermore, the amount of text after the break graphic 82 may be shown in relative proportion to provide a visual indication as to how much text is present in an added text message. Thus, the break graphic 82 visually assists the user to avoid commencement of an additional text message or, if an addition text message is commenced, delete or edit text to eliminate the additional text message. As a result, the break graphic 82 advantageously assists the user to control text messaging costs.

Proceeding to block 84 and referring to GUI 64d, when the written text reaches the payload capacity of the current text message, the header 66d may display an indication that no characters remain in the text message. In addition, the cursor 72 may be display after the break graphic 82.

Proceeding to block 86, as the user enters additional text, the entered text exceeding the payload capacity of the prior text message is displayed after the break graphic 82 (see GUI 64e). Also, proceeding to block 88, the header (see header 66e of GUI 64e) is updated to display current number of text messages that may be used to transmit the written text. Thereafter, the logical progression may return to block 76 to repeat the foregoing methodology for the current text message. GUI 64f represents a completed composition of written text that spans two text messages.

At any time during the composition of written text 68 for transmission as one or more text messages, the user may move the cursor relative to the written text 68 to add, remove and/or change characters. With such edits, the header 66 may be updated with each keystroke to indicate the number of text messages that the mobile telephone 10 may use to transmit the complete composition of written text and/or the number of characters remaining in the last of the text messages. If the user is editing text in a text message that is not the last text message, the header could indicate the text message for which the content is being edited, the total number of text messages and/or the characters remaining in the last text message. For instance, if the composition corresponds to four text messages, with twelve characters remaining in the fourth text message and the user is editing the second text message, the header 66 may read "editing message 2 of 4; 12 characters remaining in message 4" or be adapted to convey such information. Of course, the manner in which information is displayed to the user (e.g., header syntax) may be modified. Also, a scrolling header may be used to convey information that may not be displayable in an area of the GUI 64 dedicated to the header 66. For instance, the header 66 may scroll laterally or vertically through the header area.

In another embodiment, such as the embodiment illustrated in FIG. 6, the header 66 may simultaneously display the message count and the characters remaining count for the last of the text messages. In another embodiment, the header 66 may perpetually display the message count and the characters remaining count may be added when the characters remaining count threshold is reached for the last of the text messages.

Although the invention has been shown and described with respect to certain embodiments, it is understood that equivalents and modifications will occur to others skilled in the art upon the reading and understanding of the specification. The present invention includes all such equivalents and modifications, and is limited only by the scope of the following claims.

What is claimed is:

1. A method of displaying written text during the preparation of a text message to be transmitted by a mobile radio terminal, comprising:
    displaying written text entered by a user;
    displaying a graphical text message break between characters of the written text that are associated with a first text message payload that has a predetermined maximum length measured in number of characters and characters of the written text that are associated with a second text message payload that has a predetermined maximum length measured in number of characters, the first and second text messages used to transmit the written text as a multipart text message; and
    controlling a space between the graphical text message break and characters associated with the payload of the first text message such that there is a proportional correspondence between a number of characters remaining in the payload of the first text message and an end of the first text message as represented by the graphical text message break.

2. The method of claim 1, wherein the graphical text message break is a borderline extending across a display of the mobile radio terminal.

3. The method of claim 1, wherein characters displayed after the graphical text message break are shown in relative proportion to the graphical text message break to provide a visual indication as to how much text is present in the second text message.

4. The method of claim 1, further comprising displaying a text message count, the text message count indicating the number of text messages that will be used by the mobile radio terminal to transmit the written text in text message format.

5. The method of claim 1, further comprising displaying a number of available characters before a capacity of a last one of the text messages is reached.

6. A mobile radio terminal, comprising:
    a display;
    a radio circuit for communicating with a communications network; and
    a controller that executes logic to display written text during the preparation of a text message to be transmitted by a mobile radio terminal, the logic including logic to:
    display written text entered by a user on the display;
    display a graphical text message break between characters of the written text that are associated with a first text message payload that has a predetermined maximum length measured in number of characters and characters of the written text that are associated with a second text message payload that has a predetermined maximum length measured in number of characters, the first and second text messages used to transmit the written text as a multipart text message; and
    control a space between the graphical text message break and characters associated with the payload of the first text message such that there is a proportional correspondence between a number of characters remaining in the payload of the first text message and an end of the first text message as represented by the graphical text message break.

7. The mobile radio terminal of claim 6, wherein the graphical text message break is a borderline extending across a display of the mobile radio terminal.

8. The mobile radio terminal of claim 6, wherein characters displayed after the graphical text message break are shown in relative proportion to the graphical text message break to provide a visual indication as to how much text is present in the second text message.

9. The mobile radio terminal of claim 6, wherein the logic includes logic to display a text message count, the text message count indicating the number of text messages that will be used by the mobile radio terminal to transmit the written text in text message format.

10. The mobile radio terminal of claim 6, wherein the logic includes logic to display a number of available characters before a capacity of a last one of the text messages is reached.

\* \* \* \* \*